United States Patent
Kawano et al.

(10) Patent No.: US 11,898,217 B2
(45) Date of Patent: Feb. 13, 2024

(54) METHOD FOR PRODUCING STEEL PLATE MEMBER

(71) Applicant: TOYOTA JIDOSHA KABUSHIKI KAISHA, Toyota (JP)

(72) Inventors: Shoji Kawano, Toyota (JP); Shinya Yamamoto, Toyota (JP); Masatomo Niihara, Okazaki (JP); Tomoaki Ihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 17/038,479

(22) Filed: Sep. 30, 2020

(65) Prior Publication Data
US 2021/0147956 A1 May 20, 2021

(30) Foreign Application Priority Data

Nov. 18, 2019 (JP) .................................. 2019-208054

(51) Int. Cl.
*C21D 9/46* (2006.01)
*C21D 1/18* (2006.01)
(Continued)

(52) U.S. Cl.
CPC ............. *C21D 9/46* (2013.01); *B21D 22/022* (2013.01); *C21D 1/18* (2013.01); *C21D 1/42* (2013.01);
(Continued)

(58) Field of Classification Search
None
See application file for complete search history.

(56) References Cited

U.S. PATENT DOCUMENTS

2019/0106764 A1  4/2019  Ihara et al.
2019/0185957 A1  6/2019  Ihara et al.

FOREIGN PATENT DOCUMENTS

CN       206425371 U    8/2017
CN       109652622 A    4/2019
(Continued)

OTHER PUBLICATIONS

DE-102008063985-A1 with machine translation (Year: 2022).*
DE102008063985 A1 English language translation (Year: 2010).*

*Primary Examiner* — Sally A Merkling
*Assistant Examiner* — Sean P. O'Keefe
(74) *Attorney, Agent, or Firm* — Sughrue Mion, PLLC

(57) ABSTRACT

A method for producing a steel plate member (SPM), including: a quenching step for heating the SPM to a temperature higher than an austenite transformation finish temperature A3 and subsequently cooling the SPM at a cooling rate (CR) faster than an upper critical CR; and a tempering step for reheating a second region of the SPM to a temperature higher than an austenite transformation start temperature A1 without reheating a first region of the SPM after quenching and subsequently cooling the SPM at a CR slower than a lower critical CR. In the cooling process of the tempering step, the shape of the second region is corrected in a temperature range from a temperature equal to or lower than A1 to a temperature equal to or higher than a temperature at which transformation into ferrite and pearlite is finished while maintaining the CR slower than the lower critical CR.

6 Claims, 13 Drawing Sheets

(51) Int. Cl.
*C21D 1/42* (2006.01)
*C21D 8/02* (2006.01)
*B21D 22/02* (2006.01)

(52) U.S. Cl.
CPC ...... *C21D 8/0294* (2013.01); *C21D 2211/005* (2013.01); *C21D 2211/008* (2013.01); *C21D 2211/009* (2013.01); *C21D 2221/02* (2013.01)

(56) References Cited

FOREIGN PATENT DOCUMENTS

| | | | |
|---|---|---|---|
| CN | 109943687 A | 6/2019 | |
| DE | 102008063985 A1 * | 7/2010 | ............. C21D 1/673 |
| EP | 3 502 283 A1 | 6/2019 | |
| JP | 08-300040 A | 11/1996 | |
| JP | 2000-024715 A | 1/2000 | |
| JP | 2019-073793 A | 5/2019 | |

* cited by examiner

METHOD FOR PRODUCING STEEL PLATE MEMBER

CROSS REFERENCE TO RELATED APPLICATIONS

This application is based upon and claims the benefit of priority from Japanese patent application No. 2019-208054, filed on Nov. 18, 2019, the disclosure of which is incorporated herein in its entirety by reference.

BACKGROUND

The present disclosure relates to a method for producing a steel plate member, and in particular, to a method for producing a steel plate member including a hard region containing martensite and a soft region containing ferrite and pearlite.

In recent years, steel plate members including a hard region resistant to an impact and a soft region for absorbing an impact have been developed, for example, as structural members for automobiles. As disclosed in Japanese Unexamined Patent Application Publication No. 2019-073793, the present inventors have developed a method of forming a hard region and a soft region in one member by reheating a part of a steel plate member that has been quenched to a temperature between an austenite transformation start temperature A1 and an austenite transformation finish temperature A3 for tempering. As a result of using this method, an unstable microstructure containing martensite which is hard and further containing ferrite and pearlite which are soft is not formed in a boundary region of the soft region and the hard region, in consequence of which a fracture in the boundary region can be prevented.

SUMMARY

The present inventors have found the following problem regarding the method for producing the steel plate member including the hard region and the soft region.

In the method disclosed in Japanese Unexamined Patent Application Publication No. 2019-073793, there is a problem that the accuracy of the dimensions in the steel plate member is degraded due to thermal deformation based on a temperature difference between the heated part (the soft region) and the non-heated part (hard region) at the time of tempering. Even when the steel plate member is corrected after the tempering, it is difficult to sufficiently improve the accuracy of the dimensions in the steel plate member.

The present disclosure has been made in light of the above circumstances. An object of the present disclosure is to provide a method for producing a steel plate member capable of suppressing degradation in the accuracy of the dimensions in a steel plate member including a hard region and a soft region.

A method for producing a steel plate member according to one aspect of the present disclosure includes:

a quenching step for heating the steel plate member to a temperature higher than an austenite transformation finish temperature A3 and subsequently cooling the steel plate member at a cooling rate faster than an upper critical cooling rate; and a tempering step for reheating a second region of the steel plate member to a temperature higher than an austenite transformation start temperature A1 without reheating a first region of the steel plate member after quenching and subsequently cooling the steel plate member at a cooling rate slower than a lower critical cooling rate, in which a hard region containing martensite is formed in the first region and a soft region containing ferrite and pearlite is formed in the second region.

In the cooling process of the tempering step, the shape of the second region is corrected in a temperature range from a temperature that is equal to or lower than the austenite transformation start temperature A1 to a temperature that is equal to or higher than a temperature at which transformation into ferrite and pearlite is finished while maintaining the cooling rate slower than the lower critical cooling rate.

In the method for producing the steel plate member according to one aspect of the present disclosure, in the cooling process of the tempering step, the shape of the second region is corrected in the temperature range from a temperature that is equal to or lower than the austenite transformation start temperature A1 to a temperature that is equal to or higher than the temperature at which transformation into ferrite and pearlite is finished while maintaining a cooling rate slower than the lower critical cooling rate. Since the transformation superplastic phenomenon appears in accordance with the transformation from austenite to ferrite/pearlite, the shape of the second region of the steel plate member can be easily corrected with a small amount of power and the accuracy of the dimensions in the steel plate member is improved.

When the shape of the second region is corrected, the second region may be locally pressed by a correcting die having a pressing surface provided with a plurality of pins. Alternatively, the second region may be pressed by a correcting die including a heating mechanism therein. Alternatively, the second region may be pressed by a correcting die having at least a pressing surface made of a heat insulating material.

According to the aforementioned configuration, the shape of the second region of the steel plate member can be corrected while maintaining a cooling rate slower than the lower critical cooling rate.

In the reheating process of the tempering step, the second region may be reheated to a temperature between the austenite transformation start temperature A1 and the austenite transformation finish temperature A3. Compared to the case in which the second region is reheated to a temperature equal to or higher than the austenite transformation finish temperature A3, the energy efficiency becomes higher and the strength in the second region is improved.

In the reheating process of the tempering step, the second region may be reheated by induction heating. The second region of the steel plate member may be rapidly heated.

According to the present disclosure, it is possible to provide a method for producing a steel plate member capable of suppressing degradation in the accuracy of the dimensions in the steel plate member including the hard region and the soft region.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. Further, the following descriptions and drawings are simplified as appropriate for clarity of explanation.

First Embodiment

<Method for Producing Steel Plate Member>

First, with reference to FIG. 1, a method for producing a steel plate member according to a first embodiment will be described. The method for producing the steel plate member according to the first embodiment is suitable as a method for producing a steel plate member including a hard region resistant to an impact and a soft region for absorbing an impact, the steel plate member being for use, for example, in automobiles.

Figure 1:
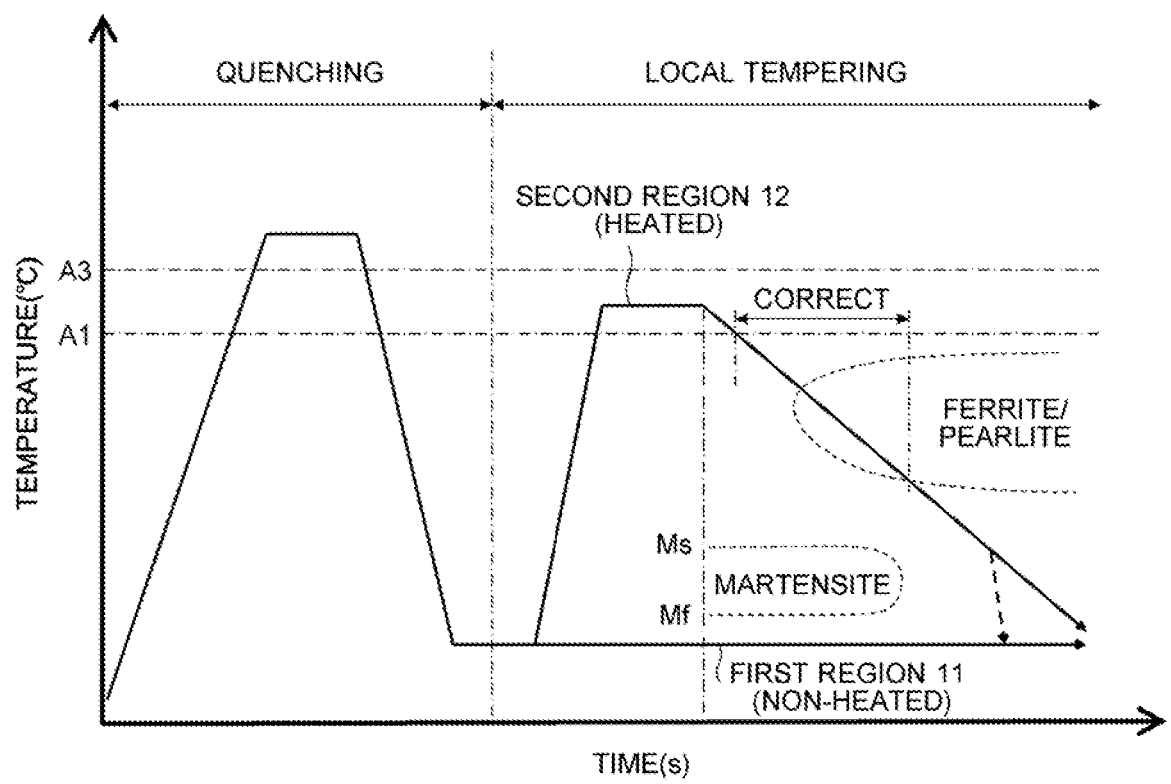
FIG. 1 is a temperature chart showing a method for producing a steel plate member according to a first embodiment.

FIG. 1 is a temperature chart showing the method for producing the steel plate member according to the first embodiment. In FIG. 1, the horizontal axis represents time (s) and the vertical axis represents temperature (° C.). As shown in FIG. 1, the method for producing the steel plate member according to the first embodiment includes a quenching step and a local tempering step. In the method for producing the steel plate member according to the first embodiment, the quenching step is performed first and then the local tempering step is performed.

<Quenching Step>

First, in the quenching step, the entire steel plate member is heated to a temperature higher than an austenite transformation finish temperature A3. In this case, the microstructure of the entire steel plate member converts from ferrite and pearlite to an austenite single phase. After that, the steel plate member is cooled at a cooling rate higher than an upper critical cooling rate. Thus, austenite is transformed into martensite and the microstructure of the entire steel plate member is converted to martensite which is hard.

In the quenching step, the steel plate member may be simply cooled after it is heated. Alternatively, the steel plate member may be cooled while being press formed. Since this press-forming is hot press forming, a high-strength steel plate member can be obtained by performing quenching at the time of the press forming while avoiding the springback that occurs during cold press forming. This hot press forming is typically called hot stamping. The steel plate used for hot stamping is, for example, but not limited to, a steel plate made of manganese-boron steel having a thickness of about 1-4 mm.

Figure 2:
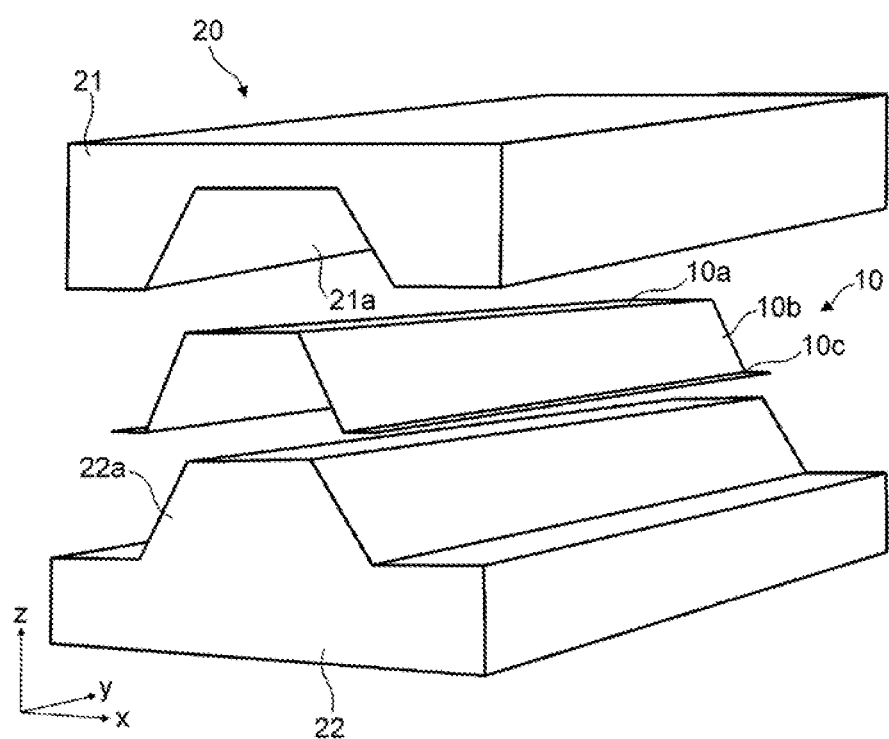
FIG. 2 is a perspective view showing one example of a hot press forming apparatus.

FIG. 2 is a perspective view showing an example of a hot press forming apparatus. As shown in FIG. 2, a hot press forming apparatus 20 includes an upper die 21 and a lower die 22, which are both dies. As shown in FIG. 2, a heated steel plate which has, for example, a flat shape, is sandwiched between the upper die 21 and the lower die 22, and cooled while being press formed, and thus quenched. The steel plate member 10 after press forming shown in FIG. 2 has a hat-shaped cross section including a top plate 10a, side walls 10b, and flange parts 10c extending in a y-axis direction. More specifically, the pair of side walls 10b are formed downward from end parts of the top plate 10a in a width direction (x-axis direction) extending in the y-axis direction. Further, each of the flange parts 10c projects outward from a lower end part (z-axis negative direction side) of the corresponding side wall 10b.

Thus, as shown in FIG. 2, a recess 21a that is recessed in a trapezoidal cross section is provided on a lower surface of the upper die 21 so as to extend in an axial direction (y-axis direction). Likewise, a projection 22a having a trapezoidal cross section is provided on an upper surface of the lower die 22 so as to extend in the axial direction (y-axis direction). FIG. 2 shows a state in which the upper die 21 and the lower die 22 are separated from each other after press-forming the steel plate member 10.

As a matter of course, the right-handed xyz orthogonal coordinates shown in FIG. 2 and other drawings are for convenience to describe the positional relationship of the components. Commonly, a z-axis positive direction is vertically upward and an xy plane is a horizontal plane.

<Local Tempering Step>

Next, as shown in FIG. 1, in the local tempering step, only a part of the region of the steel plate member is reheated and softened. Specifically, as shown in FIG. 1, a first region 11 of the steel plate member is not reheated and only a second region 12 of the steel plate member is reheated to a temperature higher than the austenite transformation start temperature A1.

Since the normal tempering temperature is lower than the austenite transformation start temperature A1, the heating temperature in the local tempering step according to the first embodiment is higher than the normal tempering temperature.

Figure 3:
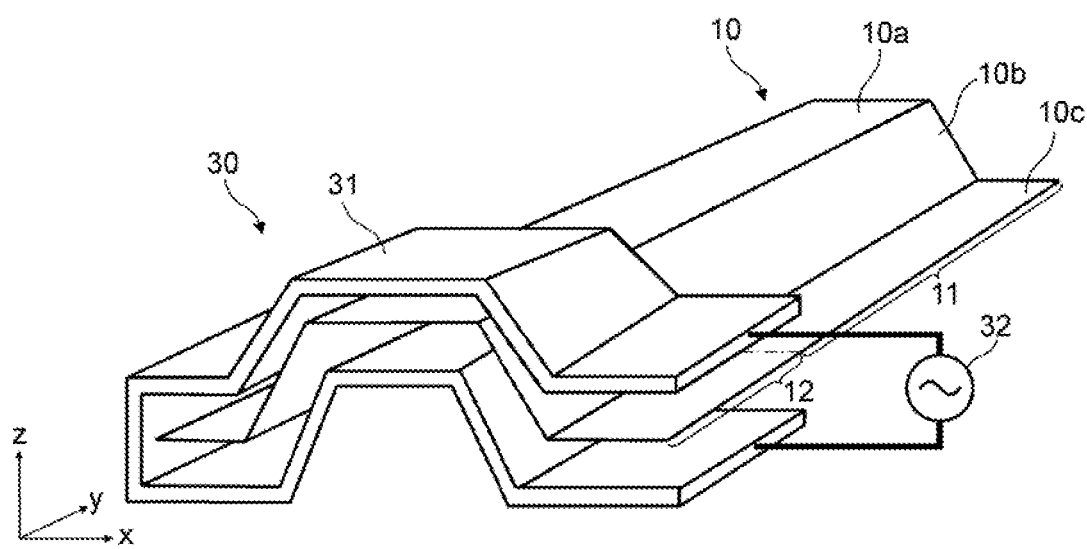
FIG. 3 is a schematic perspective view of an induction heating apparatus for reheating a second region 12 of a steel plate member 10 in a local tempering step.

Further, while the method of heating the second region 12 of the steel plate member in the local tempering step is not particularly limited, induction heating is, for example, used. FIG. 3 is a schematic perspective view of an induction heating apparatus for reheating the second region 12 of the steel plate member 10 in the local tempering step. As shown in FIG. 3, an induction heating apparatus 30 is a high-frequency induction heating apparatus including a coil 31 and a high-frequency power supply 32.

As shown in FIG. 3, the coil 31 is a horizontally-positioned plate member having a U-shaped cross section so as to cover the entire upper and lower surfaces of the steel plate member 10 in the width direction (x-axis direction). As shown in FIG. 3, the coil 31 is provided with irregularities that correspond to those of the steel plate member 10 having a hat-shaped cross section. Then the high-frequency power supply 32 is connected to respective ends of the coil 31.

The shape of the coil 31 shown in FIG. 3 is merely one example and may be split, for example, into a plurality of parts.

As shown in FIG. 3, only the second region 12 of the steel plate member 10 is inserted inside the coil 31 and is heated to a temperature higher than the austenite transformation start temperature A1 by induction heating. The second region 12 of the steel plate member 10 is reheated to, but not limited to, a temperature lower than the austenite transformation finish temperature A3 as shown in, for example, FIG. 1.

Since the first region 11 of the steel plate member 10 is exposed from the coil 31, it is not subjected to induction heating and is not thermally affected by heat conduction from the second region 12. On the other hand, the boundary region between the first region 11 and the second region 12 is heated to a temperature lower than the austenite transformation start temperature A1 by heat conduction from the second region 12 and is thermally affected. In other words, the boundary region is a region that is heated to a temperature lower than the austenite transformation start temperature A1 and is thermally affected.

In the high-frequency induction heating, the heating efficiency abruptly drops at the Curie point where the steel plate member 10 loses the magnetic properties, and thus the increase in the temperature of the heated region becomes difficult around the Curie point. Since austenite is non-magnetic while martensite, ferrite, and pearlite are ferro-magnetic, the Curie point lies between the austenite transformation start temperature A1 and the austenite transformation finish temperature A3.

Thus, with the use of high-frequency induction heating, only the second region 12 of the steel plate member 10 can be rapidly heated, and the temperature to which the second region 12 is heated can be easily and accurately kept at a temperature between the austenite transformation start temperature A1 and the austenite transformation finish temperature A3. Since rapid heating of only the second region 12 of the steel plate member 10 is possible, the boundary region thermally affected by heat conduction from the second region 12 can be narrowed.

After that, as shown in FIG. 1, the steel plate member is cooled at a cooling rate slower than the lower critical cooling rate so as not to cause martensite transformation of the second region 12. At this time, as shown by the dashed arrow in FIG. 1, after the completion of the conversion from austenite to ferrite/pearlite, the steel plate member may be rapidly cooled. Since the time for producing the steel plate member is reduced by rapid cooling, the production efficiency can be improved.

FIG. 1 schematically shows a martensite transformation start temperature Ms, a martensite transformation finish temperature Mf, and a ferrite/pearlite nose in a Continuous Cooling Transformation (CCT) phase diagram. That is, FIG. 1 schematically shows the process in which the second region 12 having been reheated to a temperature between the austenite transformation start temperature A1 and the austenite transformation finish temperature A3 is cooled at a cooling rate slower than the lower critical cooling rate.

<Change in Microstructures in Local Tempering Step>

Figure 4:
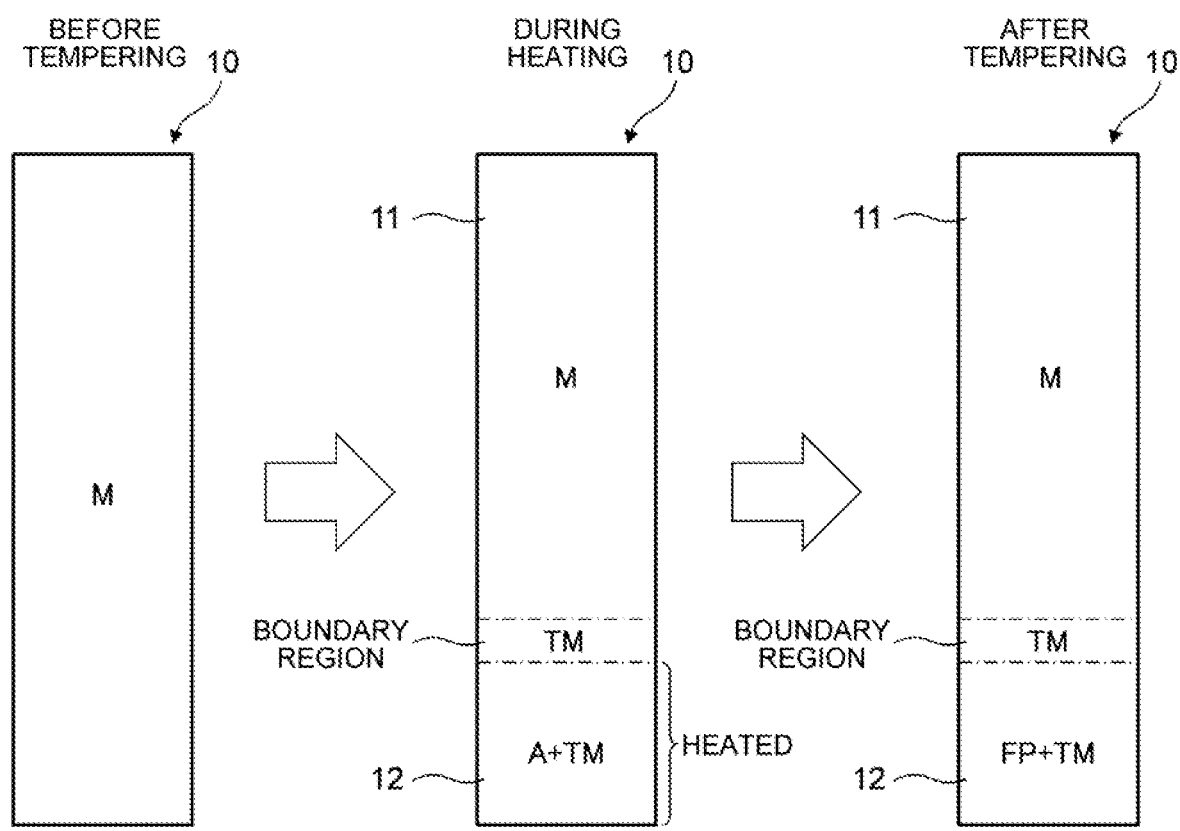
FIG. 4 is a schematic plan view showing a change in microstructures of the steel plate member in the local tempering step when only the second region 12 of the steel plate member 10 is reheated to a temperature between an austenite transformation start temperature A1 and an austenite transformation finish temperature A3.

With reference to FIG. 4, a change in microstructures in the local tempering step will be described. FIG. 4 is a schematic plan view showing the change in the microstructures of the steel plate member in the local tempering step when only the second region 12 of the steel plate member 10 is reheated to a temperature between the austenite transformation start temperature A1 and the austenite transformation finish temperature A3.

First, the microstructure of the steel plate member 10 which has been subjected to the quenching step but has yet to be subjected to the local tempering step shown in the left part of FIG. 4 will be described. As shown in the left part of FIG. 4, the entire microstructure of the steel plate member 10 before the local tempering step (i.e., after the quenching step) contains martensite M.

Next, a microstructure of the steel plate member 10 which is being heated in the local tempering step shown in the middle part of FIG. 4 will be described. As shown in the temperature chart in FIG. 1, only the second region 12 of the steel plate member 10 is reheated to a temperature between the austenite transformation start temperature A1 and the austenite transformation finish temperature A3 during the heating in the local tempering step.

Therefore, as shown in the middle part of FIG. 4, during the heating in the local tempering step, the martensite M is converted to tempered martensite TM and a part of the tempered martensite TM is further converted to austenite A in the second region 12. That is, the microstructure of the second region 12 becomes a mixed structure of the tempered martensite TM and the austenite A. Since the temperature of the heated second region 12 is close to the austenite transformation start temperature A1 in the vicinity of the boundary region in the second region 12, the amount of the austenite A decreases while the amount of the tempered martensite TM increases.

The tempered martensite TM is used herein to collectively refer to all structures resulting from the reheating-induced softening of the martensite M and encompasses troostite and sorbite.

Meanwhile, the first region 11 of the steel plate member 10 is not reheated and thus is not thermally affected. The microstructure of the first region 11 therefore remains unchanged from the martensite M.

The boundary region between the first region 11 and the second region 12 is heated to a temperature lower than the austenite transformation start temperature A1 by heat conduction from the second region 12 and thermally affected. This converts the microstructure of the boundary region from the martensite M to the tempered martensite TM.

More specifically, the temperature of the boundary region becomes higher and closer to the austenite transformation start temperature A1 with decreasing distance from the second region 12. For this reason, the microstructure on the side of the second region 12 of the boundary region, which is a major portion of the boundary region, is consisting of only the tempered martensite TM. In the vicinity of the first region 11 in the boundary region, both the tempered martensite TM and the martensite M are present. With decreasing distance from the first region 11 which is consisting of only the martensite M, the amount of the tempered martensite TM decreases and the amount of the martensite M increases.

As stated above, since the amount of the tempered martensite TM heated to a high temperature increases with decreasing distance from the second region 12, the boundary region becomes softer gradually in the direction from the first region 11 which is hard to the second region 12 which is soft.

Next, the microstructure of the steel plate member 10 which has been subjected to the local tempering step shown in the right part of FIG. 4 will be described. As shown in FIG. 1, the cooling process in the local tempering step cools the steel plate member 10 at a cooling rate slower than the lower critical cooling rate. Thus, as shown in the right part of FIG. 4, the austenite A in the second region 12 that has appeared during the heating is converted to ferrite and pearlite (ferrite/pearlite) FP. As a result, the microstructure of the second region 12 becomes a mixed structure of the tempered martensite TM and ferrite/pearlite FP. The microstructure of the first region 11 remains unchanged from the martensite M. The microstructure of the boundary region remains unchanged from the tempered martensite TM as well.

When the second region 12 is reheated to a temperature higher than the austenite transformation finish temperature A3 in the local tempering step, the second region 12 after the cooling becomes a microstructure consisting of only ferrite/pearlite FP, the strength thereof is further reduced and becomes soft. Then a mixed structure of the tempered martensite TM and ferrite/pearlite FP appears on the side of the second region 12 in the boundary region and a single structure containing only the tempered martensite TM appears on the side of the first region 11 in the boundary region.

<Microstructures of Steel Plate Member that has been Produced>

Figure 5:
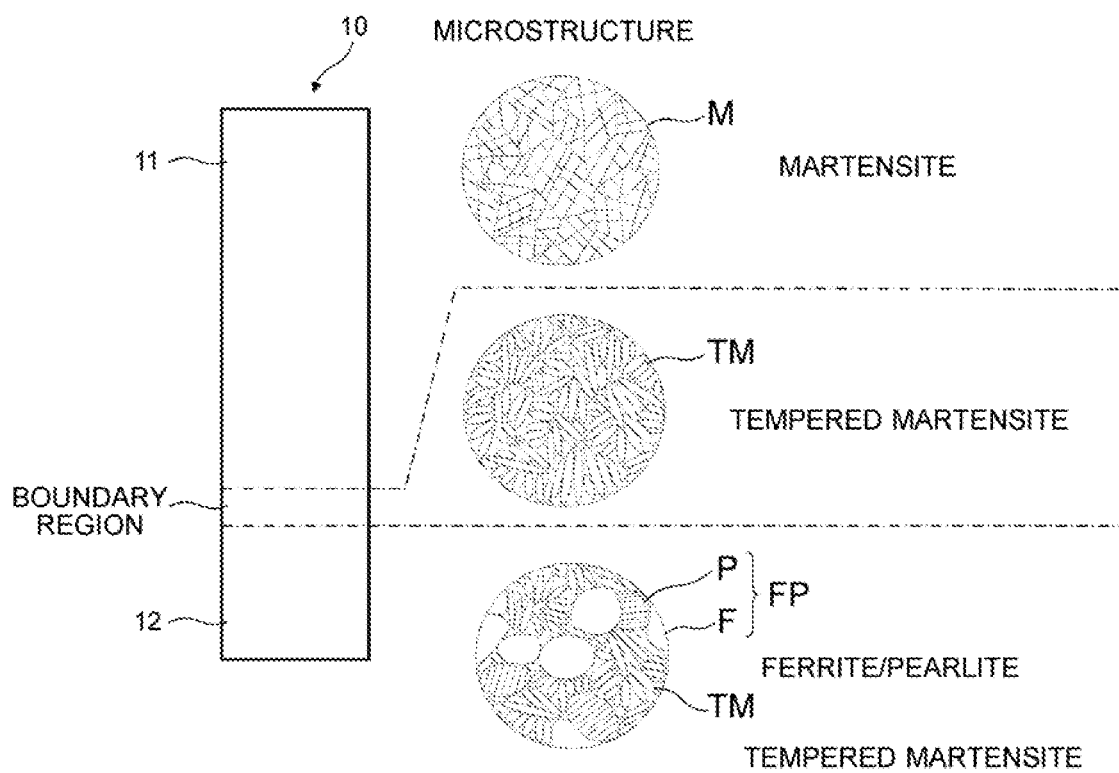
FIG. 5 is a schematic plan view showing microstructures of a steel plate member that has been produced.

FIG. 5 is a schematic plan view showing microstructures of the steel plate member that has been produced. FIG. 5 schematically shows the respective microstructures of the first region 11, the second region 12, and the boundary region. Note that the microstructures of the steel plate member 10 shown in FIG. 5 are identical to the microstructures of the steel plate member 10 which has been subjected to the local tempering step shown in the right part of FIG. 4.

As shown in FIG. 5, the steel plate member 10 includes the first region 11 containing martensite M which is hard and the second region 12 containing ferrite F and pearlite P (ferrite/pearlite FP) which are soft. As shown in FIG. 1, when the second region 12 is reheated to a temperature lower than the austenite transformation finish temperature A3 in the local tempering step, the second region 12 also contains tempered martensite TM which is soft.

A major portion of the boundary region (a region heated to a temperature equal to or lower than the austenite transformation start temperature A1) formed between the first region 11 and the second region 12 has a microstructure consisting of only the tempered martensite TM. In the vicinity of the first region 11 in the boundary region, both the tempered martensite TM and the martensite M are present. With decreasing distance from the first region 11, the amount of the tempered martensite TM decreases and the amount of the martensite M increases.

As described above, the boundary region of the steel plate member 10 has a microstructure consisting of only the tempered martensite TM and does not have an unstable microstructure in which martensite which is hard and ferrite and pearlite which are soft are present. It is therefore possible to prevent a fracture in the boundary region between the first region 11 which is hard and the second region 12 which is soft. While both the tempered martensite TM and the martensite M are present in the vicinity of the first region 11 in the boundary region, a fracture can be prevented because of a small difference in hardness between the tempered martensite TM and the martensite M adjacent to each other.

Further, the boundary region of the steel plate member 10 is heated to a higher temperature and thus becomes softer with decreasing distance from the second region 12 heated in the local tempering step. That is, the boundary region of the steel plate member 10 becomes softer gradually in the direction from the side of the first region 11 which is hard to the side of the second region 12 which is soft. It is therefore possible to prevent a fracture in the boundary region between the first region 11 which is hard and the second region 12 which is soft more efficiently.

In the steel plate member 10, the second region 12, which is the soft region, includes the microstructure in which ferrite/pearlite FP and the tempered martensite TM are present. However, since both ferrite/pearlite FP and the tempered martensite TM heated to the austenite transformation start temperature A1 are soft, a fracture is not likely to occur also in the second region 12.

<Correction in Cooling Process of Local Tempering Step>

As shown in FIG. 1, one feature of the method for producing the steel plate member according to the first embodiment is to correct the shape of the second region 12 of the steel plate member 10 in the cooling process of the local tempering step. Specifically, the shape of the second region 12 of the steel plate member 10 is corrected in a temperature range from a temperature that is equal to or lower than the austenite transformation start temperature A1 to a temperature that is equal to or higher than a temperature at which transformation to ferrite and pearlite is finished (ferrite/pearlite transformation finish temperature) while maintaining a cooling rate slower than the lower critical cooling rate.

In the temperature range from a temperature that is equal to or lower than the austenite transformation start temperature A1 to a temperature that is equal to or higher than the temperature at which ferrite/pearlite transformation is finished in the cooling process of the local tempering step, in the second region 12 of the steel plate member 10, the transformation superplastic phenomenon appears in accordance with the transformation from austenite to ferrite/pearlite. Therefore, the shape of the second region 12 of the steel plate member 10 can be easily corrected with a small amount of power and the accuracy of the dimensions in the steel plate member is improved.

Note that the correction can be started from a temperature higher than the austenite transformation start temperature A1 in the cooling process. Alternatively, the correction can be started from the reheating process of the local tempering step. Further, the correction can be continued to a temperature lower than the ferrite/pearlite transformation finish temperature.

Figure 6:
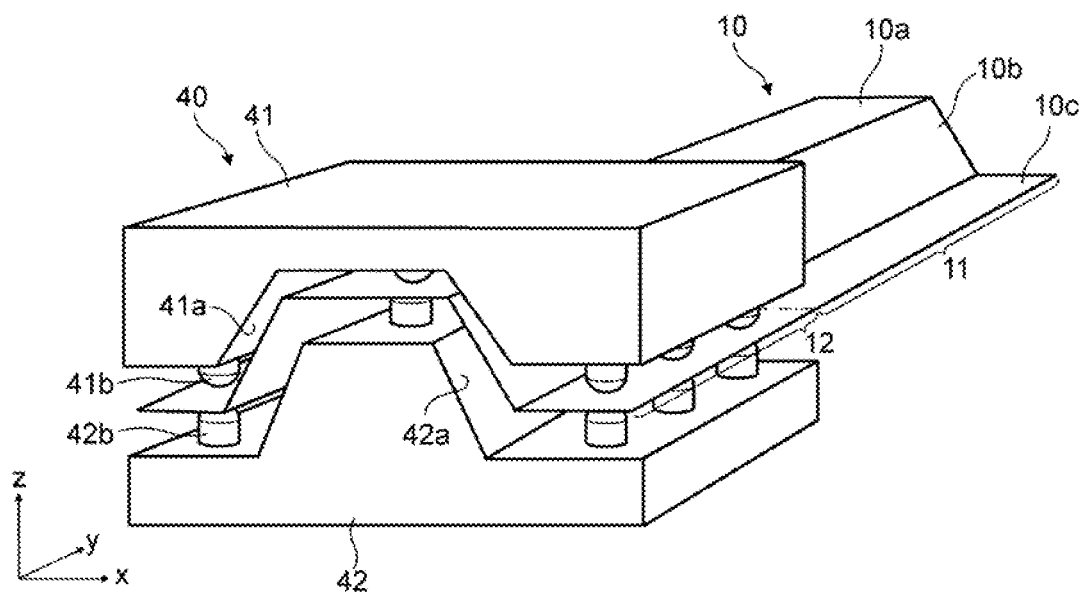
FIG. 6 is a schematic perspective view of a correcting device for correcting the shape of the second region 12 of the steel plate member 10 in a cooling process of the local tempering step.

FIG. 6 is a schematic perspective view of a correcting device for correcting the shape of the second region 12 of the steel plate member 10 in the cooling process of the local tempering step. As shown in FIG. 6, a correcting device 40 includes an upper die 41 and a lower die 42, which are metal correcting dies. The second region 12 of the steel plate member 10 which is in the middle of being cooled is sandwiched between the upper die 41 and the lower die 42 and corrected. FIG. 6 shows a state in which the steel plate member 10 is pressed by the upper die 41 and the lower die 42 and corrected.

As shown in FIG. 6, the correcting device 40 has a basic configuration that is similar to that of the section where the second region 12 is formed in the hot press forming apparatus 20 shown in FIG. 2. Specifically, in a manner similar to the upper die 21 for press forming shown in FIG. 2, a recess 41a that is recessed in a trapezoidal cross section is provided on the lower surface of the upper die 41 so as to extend in the axial direction (y-axis direction). Further, in a manner similar to the lower die 22 for press forming shown in FIG. 2, a projection 42a having a trapezoidal cross section is provided on the upper surface of the lower die 42 so as to extend in the axial direction (y-axis direction).

A plurality of pins 41b and a plurality of pins 42b for locally pressing the second region 12 of the steel plate member 10 are provided on a pressing surface (lower surface) of the upper die 41 and a pressing surface (upper surface) of the lower die 42. As shown in FIG. 6, the plurality of pins 41b provided on the lower surface of the upper die 41 and the plurality of pins 42b provided on the upper surface of the lower die 42 are provided in such a way that they are opposed to each other via the second region 12 of the steel plate member 10.

Since the aforementioned pins 41b and 42b locally press the second region 12 of the steel plate member 10, the area in which the upper die 41 and the lower die 42 contact the second region 12 of the steel plate member 10 decreases. As a result, heat removal from the second region 12 of the steel plate member 10 by the upper die 41 and the lower die 42 is suppressed, and the shape of the second region 12 of the steel plate member 10 can be corrected while maintaining a cooling rate slower than the lower critical cooling rate.

Figure 7:
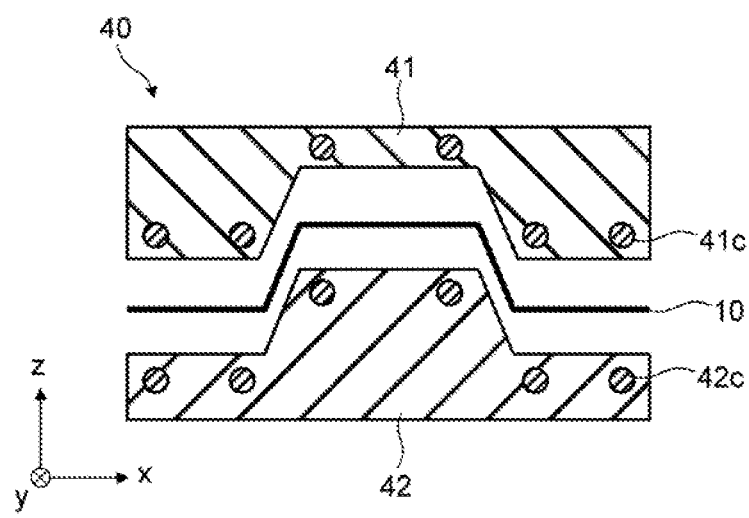
FIG. 7 is a schematic cross-sectional view of a modified example of the correcting device.

FIG. 7 is a schematic cross-sectional view according to a modified example of the correcting device. The correcting device shown in FIG. 7 also includes an upper die 41 and a lower die 42, which are correcting dies. In the correcting device shown in FIG. 7, the pins 41b and 42b shown in FIG. 6 are not provided, and heaters 41c and 42c, which are heating mechanisms, are provided inside the upper die 41 and the lower die 42. In the correcting device shown in FIG. 7, the heaters 41c and 42c are respectively provided in the vicinity of the lower surface of the upper die 41 and the upper surface of the lower die 42 in such a way that the pressing surface (lower surface) of the upper die 41 and the pressing surface (upper surface) of the lower die 42 can be uniformly heated, although the configuration of the heaters 41c and 42c is not limited in particular.

In the correcting device 40 shown in FIG. 7, the upper die 41 and the lower die 42 can be respectively heated by the heaters 41c and 42c. Therefore, heat removal from the second region 12 of the steel plate member 10 by the upper die 41 and the lower die 42 is suppressed, and the shape of the second region 12 of the steel plate member 10 can be corrected while maintaining a cooling rate slower than the lower critical cooling rate. Further, since the second region 12 of the steel plate member 10 can be pressed by the whole lower surface of the upper die 41 and the whole upper surface of the lower die 42, it is possible to perform correction with a higher accuracy.

Instead of providing the heaters 41c and 42c, the shape of the second region 12 may be corrected using the upper die 41 and the lower die 42 having at least the pressing surfaces made of a heat insulating material. Likewise, the shape of the second region 12 of the steel plate member 10 can be corrected while maintaining a cooling rate slower than the lower critical cooling rate.

<Specific Example of Steel Plate Member>

Figure 8:
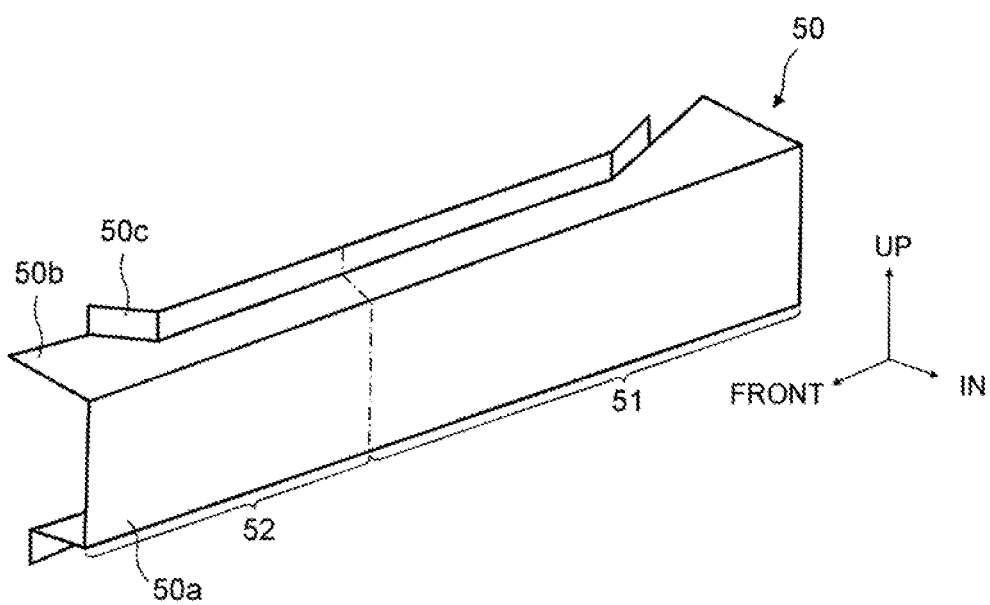
FIG. 8 is a perspective view of a specific example of the steel plate member produced using the method for producing the steel plate member according to the first embodiment.
Figure 9:
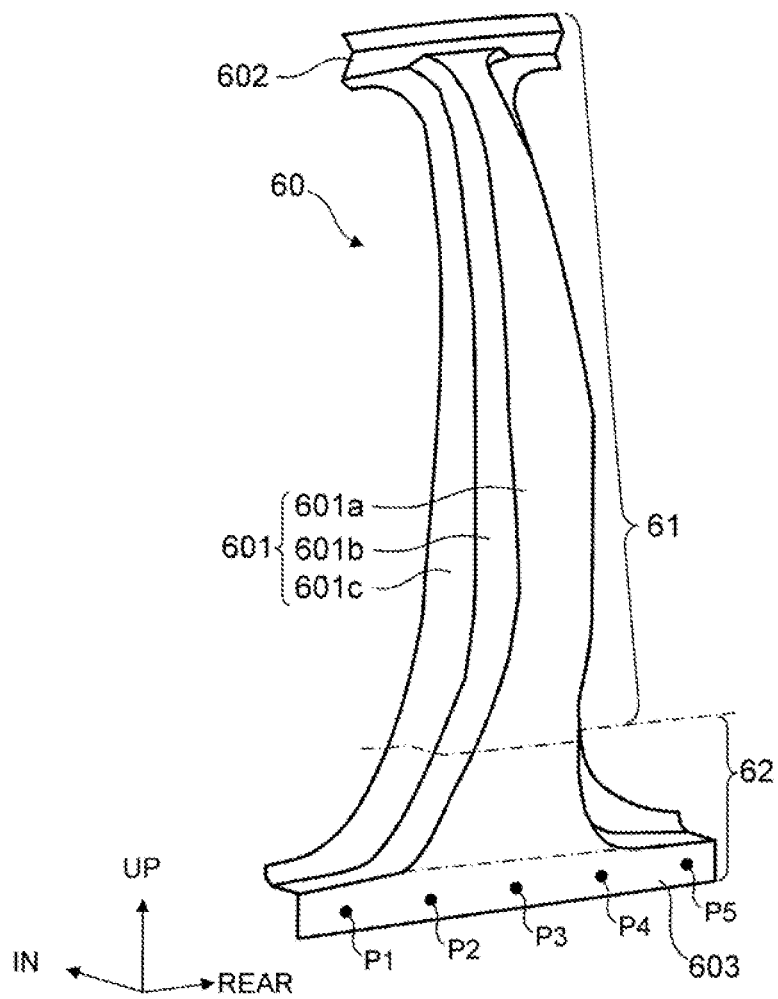
FIG. 9 is a perspective view of a specific example of the steel plate member produced using the method for producing the steel plate member according to the first embodiment.

Next, with reference to FIGS. 8 and 9, a specific example of the steel plate member produced using the method for producing the steel plate member according to the first embodiment will be described. FIGS. 8 and 9 are perspective views of the specific example of the steel plate member produced using the method for producing the steel plate member according to the first embodiment. The arrows shown in FIGS. 8 and 9 indicate the respective directions in a vehicle.

The applications and the shapes of the steel plate member shown in FIGS. 8 and 9 are merely examples and the applications and the shapes of the steel plate member produced using the method for producing the steel plate member according to the first embodiment should not be limited.

A steel plate member 50 shown in FIG. 8 is one example of a side member that is a vehicle member, and more specifically, a front side member inner.

The steel plate member 50 shown in FIG. 8 has a hat-shaped cross section including a top plate 50a, side walls 50b, and flange parts 50c extending in a front-rear direction. More specifically, the pair of side walls 50b are formed outward from end parts of the top plate 50a in the width direction extending in the front-rear direction. Further, each of the flange parts 50c projects outward (i.e., upper side or lower side in FIG. 8) from an end part of the corresponding side wall 50b.

In a manner similar to the steel plate member 10 shown in FIG. 5, the steel plate member 50 shown in FIG. 8 includes a first region 51 containing martensite M which is hard and a second region 52 containing ferrite F and pearlite P (ferrite/pearlite FP) which are soft. The steel plate member 50 can be produced by quenching the entire part of the steel plate member 50 while hot press forming it and then locally tempering only the second region 52 using the method for producing the steel plate member according to this embodiment. The front second region 52 in the steel plate member 50 shown in FIG. 8 has a low strength and an excellent impact absorption property, while the rear first region 51 has a high strength. With this configuration, the steel plate member 50 is able to achieve both a high strength and excellent impact absorption characteristics.

A steel plate member 60 shown in FIG. 9 is a steel plate member for pillars that are vehicle members, more specifically, a center pillar reinforcement.

As shown in FIG. 9, the steel plate member 60 according to a second embodiment includes a main body part 601, an upper flange part 602, and a lower flange part 603.

As shown in FIG. 9, the main body part 601 is a section having a hat-shaped cross section including a top plate 601a, side walls 601b, and flange parts 601c extending in a vertical direction. More specifically, the pair of side walls 601b are formed inward from end parts of the top plate 601a in the width direction extending in the vertical direction. Further, each of the flange parts 601c projects outward (the front-rear direction shown in FIG. 9) from the end part of the corresponding side wall 601b.

Further, the main body part 601 is slightly curved as a whole so as to project outward. Furthermore, an upper end part and a lower end part of the main body part 601 are formed in a T shape in a plan view extending in the width direction (the front-rear direction shown in FIG. 9). Here, the lower end part is extended in the width direction (the front-rear direction shown in FIG. 9) to be wider than the upper end part.

The upper flange part 602 includes a plate surface that rises outward from an upper end part of the main body part 601 and a plate surface that projects upward from an outer end part of the other surface. That is, the upper flange part 602 is a part having an L-shaped cross section that extends in the width direction (the front-rear direction shown in FIG. 9).

The lower flange part 603 is a flat part projecting to be extended from a lower end part of the top plate 601a to a lower side extending in the width direction (the front-rear direction shown in FIG. 9).

In a manner similar to the steel plate member 10 shown in FIG. 5, the steel plate member 60 shown in FIG. 9 also includes a first region 61 containing martensite M which is hard and a second region 62 containing ferrite F and pearlite P (ferrite/pearlite FP) which are soft. The steel plate member 60 can be produced by quenching the entire part of the steel plate member 60 while hot press forming it and subsequently locally tempering only the second region 62 using the method for producing the steel plate member according to this embodiment.

As shown in FIG. 9, in the steel plate member 60, a region from a lower part of the main body part 601 to the lower flange part 603, which is the second region 62, has a low strength and an excellent impact absorption property. On the other hand, a region from a part in the vicinity of the central part of the main body part 601 to the upper flange part 602, which is the first region 61, has a high strength. According to this configuration, the steel plate member 60 is able to achieve both a high strength and excellent impact absorption characteristics.

Experimental Example

In the following, an experimental example regarding the method for producing the steel plate member according to the first embodiment will be described. A quenching material of steel plate used for hot stamping made of flat (thickness: 2.0 mm, width: 35 mm, and length: 140 mm) manganese-boron steel (22MnB5 steel) was used as the steel plate member 10. The austenite transformation start temperature A1 of this type of steel is 727° C., the austenite transformation finish temperature A3 is 800° C., and the ferrite/pearlite transformation finish temperature is 550° C.

Figure 10:
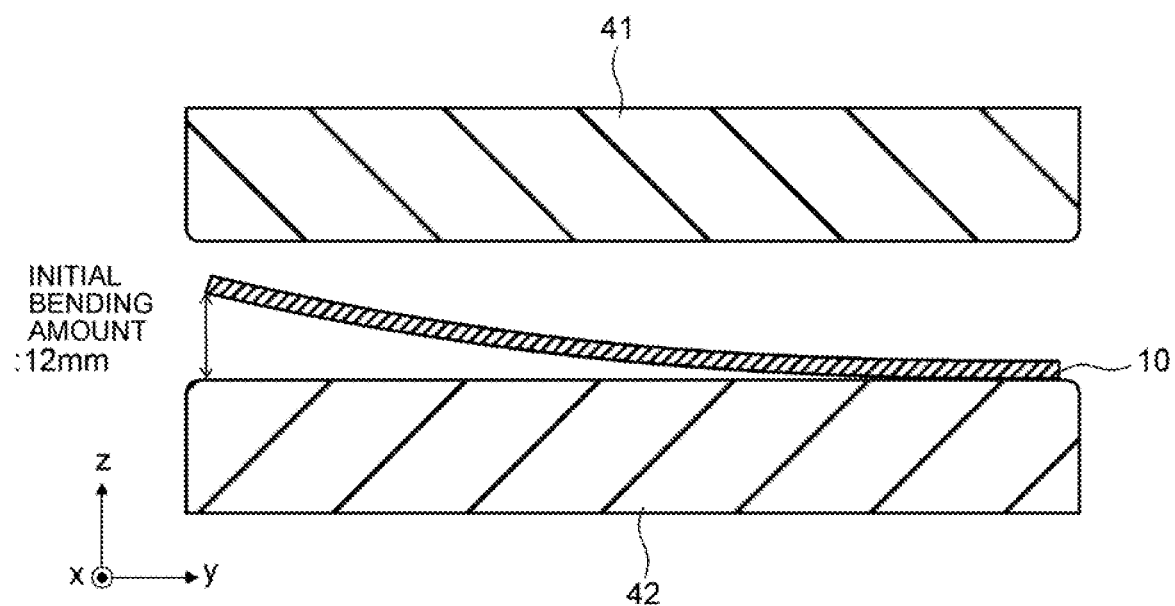
FIG. 10 is a schematic cross-sectional view of a correcting device according to an experimental example.

An initial bending amount of 12 mm was added to the above steel plate member 10, as shown in FIG. 10. FIG. 10 is a schematic cross-sectional view of a correcting device according to the experimental example. The y-axis direction shown in FIG. 10 corresponds to a longitudinal direction of the steel plate member 10. The steel plate member 10 to which the initial bending was added was reheated to 740° C., which is a temperature higher than the austenite transformation start temperature A1, and then cooled at a cooling rate slower than the lower critical cooling rate by air cooling for tempering.

At the timing when the steel plate member 10 was cooled to a predetermined temperature in the cooling process of tempering, the steel plate member 10 was sandwiched between the upper die 41 and the lower die 42 shown in FIG. 10, and the shape thereof was corrected. By using angular blocks made of ceramic, which is a heat insulating material, as the upper die 41 and the lower die 42, the cooling rate was maintained at a cooling rate slower than the lower critical cooling rate. The correction start temperature was changed to 100° C., 580° C., 630° C., 700° C., and the change in the amount of bending (i.e., the amount of correction) was investigated. The shape of the steel plate member 10 was corrected by only the weight of the upper die 41 itself without giving a load for the correction.

Figure 11:
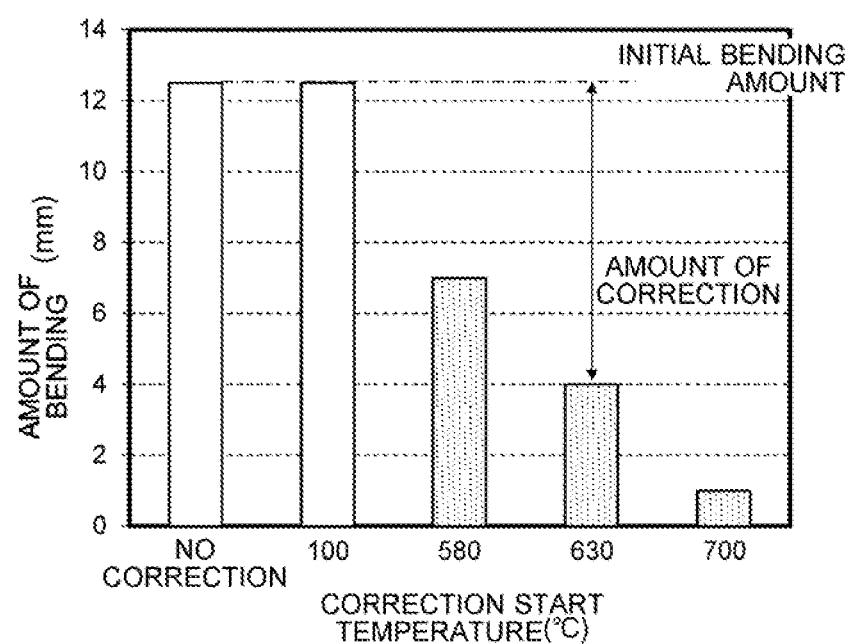
FIG. 11 is a bar graph showing a relation between a correction start temperature and an amount of bending.

FIG. 11 is a bar graph indicating a relation between the correction start temperature and the amount of bending. As shown in FIG. 11, when the correction start temperature was 100° C., the amount of bending was substantially the same as that when the correction was not performed, which means that the steel plate member 10 could not be efficiently corrected. On the other hand, as shown by dots in FIG. 11, at 580° C., 630° C., and 700° C. where the correction start temperature exceeded the ferrite/pearlite transformation finish temperature (550° C.), the amount of bending has abruptly decreased as the temperature increases. That is, it has been found that the amount of correction has abruptly increased and the steel plate member 10 could be efficiently corrected with a small amount of power.

Example

In the following, an Example of the method for producing the steel plate member according to the first embodiment will be described. The steel plate member 60 shown in FIG. 9 was produced from a flat steel plate used for hot stamping having a thickness of 1.8 mm made of manganese-boron steel (22MnB5 steel) by the method for producing the steel plate member according to the first embodiment.

Figure 12:
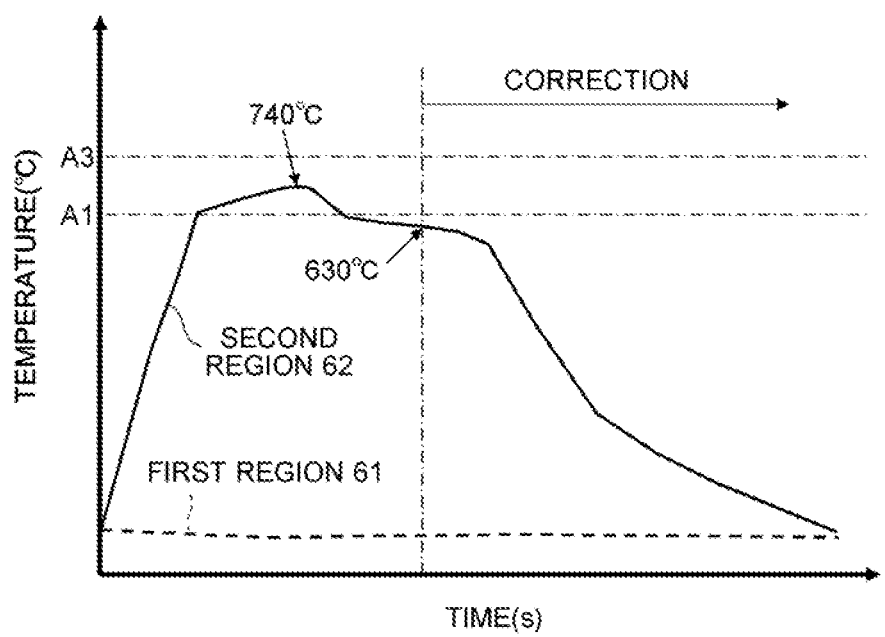
FIG. 12 is a temperature chart showing conditions of local tempering according to an Example.

FIG. 12 is a temperature chart showing conditions of local tempering according to the Example. FIG. 12 shows temperature profiles in two regions of the first region 61 and the second region 62.

As shown in FIG. 12, after heating only the second region 62 of the steel plate member 60 to 740° C., which is a temperature between the austenite transformation start temperature A1 and the austenite transformation finish temperature A3, the steel plate member 60 was cooled at a cooling rate that is lower than the upper critical cooling rate by air cooling so that the second region 62 is not transformed into martensite. At the timing when the steel plate member 60 was cooled to 630° C. in the cooling process of tempering, the steel plate member 10 was sandwiched between the upper die 41 and the lower die 42 shown in FIG. 6 and then corrected. By locally pressing the second region 62 of the steel plate member 60 by the pins 41b and 42b, the cooling rate was maintained at a cooling rate slower than the lower critical cooling rate. The load for the correction was set to 20 T.

Figure 13:
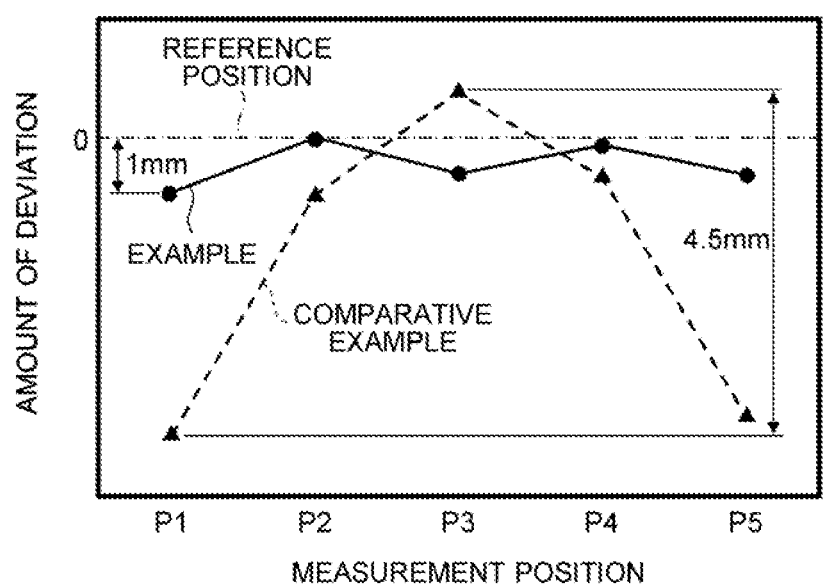
FIG. 13 is a graph showing an amount of deviation from a reference position in measurement points P1-P5.

Regarding the produced steel plate member 60, the amount of deviation from a reference position was measured in five measurement points P1-P5 shown in FIG. 9 and the results of the measurement were compared to those of the steel plate member 60 according to a comparative example produced without correction. FIG. 13 is a graph showing the amount of deviation from the reference position in the measurement points P1-P5. In FIG. 13, the Example is shown by a solid line and the comparative example is shown by a dashed line. As shown in FIG. 13, while the width of the amount of deviation from the reference position is 4.5 mm in the comparative example, the width of the amount of deviation from the reference position is 1.0 mm in this Example, and the accuracy of the dimensions in the steel plate member has been dramatically improved.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for producing a steel plate member, comprising:
   a hot press forming step comprising heating the steel plate member to a temperature higher than an austenite transformation finish temperature A3 and subsequently cooling the steel plate member at a cooling rate faster than an upper critical cooling rate while press forming the steel plate member; and
   a tempering step comprising reheating a second region of the steel plate member to a temperature higher than an austenite transformation start temperature A1 without reheating a first region of the steel plate member after the hot press forming step using an induction heating apparatus including a coil that is a horizontally-positioned plate member having a U-shaped cross section to cover the entire upper and lower surfaces of the steel plate member in an x-axis direction, and subsequently cooling the steel plate member at a cooling rate slower than a lower critical cooling rate, wherein
   a hard region containing martensite is formed in the first region and a soft region containing ferrite and pearlite is formed in the second region, and
   the cooling process of the tempering step includes correcting the shape of the second region in a temperature range from a temperature that is equal to or lower than the austenite transformation start temperature A1 to a temperature that is equal to or higher than a temperature at which transformation into ferrite and pearlite is finished while maintaining the cooling rate slower than the lower critical cooling rate.

2. The method for producing the steel plate member according to claim 1, wherein, correcting the shape of the second region by locally pressing the second region by a correcting die having a pressing surface provided with a plurality of pins.

3. The method for producing the steel plate member according to claim 1, wherein, correcting the shape of the second region by pressing the second region by a correcting die including a heating mechanism therein.

4. The method for producing the steel plate member according to claim 1, wherein, correcting the shape of the second region by pressing the second region by a correcting die having at least a pressing surface made of a heat insulating material.

5. The method for producing the steel plate member according to claim 1, comprising, in the reheating process of the tempering step, the second region is reheated to a temperature between the austenite transformation start temperature A1 and the austenite transformation finish temperature A3.

6. The method for producing the steel plate member according to claim 1, wherein, correcting the shape of the second region by pressing the second region by a correcting die having a continuous pressing surface.

* * * * *